United States Patent
Götz et al.

(10) Patent No.: US 12,287,613 B2
(45) Date of Patent: Apr. 29, 2025

(54) METHOD AND ASSEMBLY FOR MANAGING AUTOMATION PROGRAMS FOR INDUSTRIAL AUTOMATION PLATFORMS

(71) Applicant: Siemens Aktiengesellschaft, Munich (DE)

(72) Inventors: Jan Götz, Buckenhof (DE); Ludwig Andreas Mittermeier, Munich (DE); Harald Müller, Seefeld-Hechendorf (DE); Sreenath Premnadh, Maisach (DE)

(73) Assignee: Siemens Aktiengesellschaft, Munich (DE)

( * ) Notice: Subject to any disclaimer, the term of this patent is extended or adjusted under 35 U.S.C. 154(b) by 416 days.

(21) Appl. No.: 17/912,555

(22) PCT Filed: Feb. 25, 2021

(86) PCT No.: PCT/EP2021/054633
§ 371 (c)(1),
(2) Date: Sep. 19, 2022

(87) PCT Pub. No.: WO2021/185547
PCT Pub. Date: Sep. 23, 2021

(65) Prior Publication Data
US 2023/0324870 A1    Oct. 12, 2023

(30) Foreign Application Priority Data

Mar. 20, 2020 (EP) .................................... 20164384

(51) Int. Cl.
*G05B 19/05*    (2006.01)
(52) U.S. Cl.
CPC .......... *G05B 19/056* (2013.01); *G05B 19/052* (2013.01); *G05B 2219/13125* (2013.01)

(58) Field of Classification Search
CPC ................ G05B 19/056; G05B 19/052; G05B 2219/13125; G06F 2009/45595; G06F 9/45558; G06F 2009/45587; G06F 9/455
See application file for complete search history.

(56) References Cited

U.S. PATENT DOCUMENTS

| | | | |
|---|---|---|---|
| 11,074,091 B1* | 7/2021 | Nayakbomman | ....... G06F 9/455 |
| 2018/0365039 A1 | 12/2018 | Kohler et al. | |

(Continued)

FOREIGN PATENT DOCUMENTS

| | | |
|---|---|---|
| EP | 3564764 | 11/2019 |
| JP | 2004-280305 | 10/2004 |

(Continued)

OTHER PUBLICATIONS

Arun Gupta, Alan Hohn, "Getting Started with Kubernetes", 2019, DZone, A devada media property (Year: 2019).*
Heiko Koziolek, "Dynamic Updates of Virtual PLCs Deployed as Kubernetes Microservices", 2021, Springer Nature Switzerland, ECSA 2021, LNCS 12857, pp. 3-19 (Year: 2021).*

(Continued)

*Primary Examiner* — Christopher W Carter
(74) *Attorney, Agent, or Firm* — Cozen O'Connor

(57) ABSTRACT

A method and to assembly for managing an automation program for an industrial automation platform, wherein the automation program is transferred to the automation platform and execution of the automation program is controlled, where in a first step, the automation program or a reference to the automation program is transferred from a Kubernetes master a virtual kubelet, in a second step, the transferred or referenced automation program is transferred to the industrial automation platform via a provider interface of the virtual kubelet, and in a third step, the execution of the transferred automation program on the industrial automation platform is controlled, where via the provider interface, control commands are transferred to the industrial automation platform and acknowledgement messages of the industrial automation platform are received and processed or (Continued)

forwarded to a control entity, such that automation programs can be managed, distributed and run using container orchestration systems.

12 Claims, 2 Drawing Sheets

(56) References Cited

U.S. PATENT DOCUMENTS

| | | | |
|---|---|---|---|
| 2019/0116110 A1* | 4/2019 | Raney | G06F 8/60 |
| 2019/0339663 A1 | 11/2019 | Park | |
| 2020/0073692 A1* | 3/2020 | Rao | H04L 12/4633 |
| 2020/0186616 A1* | 6/2020 | Fitzer | G06F 16/9014 |
| 2021/0064003 A1 | 3/2021 | Yoneda et al. | |

FOREIGN PATENT DOCUMENTS

| | | |
|---|---|---|
| JP | 2019-159532 | 9/2019 |
| WO | WO 2016/089689 | 6/2016 |

OTHER PUBLICATIONS

Heiko Koziolek, "Fast state transfer for updates and live migration of industrial controller runtimes in container orchestration systems ", 2024, Elsevier, The Journal of Systems and Software, 211 (Year: 2024).*

PCT International Search Report and Written Opinion of International Searching Authority mailed May 31, 2021 corresponding to PCT International Application No. PCT/EP2021/054633 filed Feb. 25, 2021.

Join GitHub today Seiten 1-6 https://github.com/virtual-kubelet/virtual-kubelet.

* cited by examiner

METHOD AND ASSEMBLY FOR MANAGING AUTOMATION PROGRAMS FOR INDUSTRIAL AUTOMATION PLATFORMS

CROSS-REFERENCE TO RELATED APPLICATIONS

This is a U.S. national stage of application No. PCT/EP2021/054633 filed 25 Feb. 2021. Priority is claimed on European Application No. 20164384.1 filed 20 Mar. 2020, the content of which is incorporated herein by reference in its entirety.

BACKGROUND OF THE INVENTION

1. Field of the Invention

The invention relates to an assembly and method for managing automation applications for industrial automation platforms.

2. Description of the Related Art

Automation applications in automation systems consist of one or more automation programs, for example, in accordance with the International Electrotechnical Commission (IEC) 61131 standard, which run on industrial automation platforms. Such industrial automation platforms can be, for example, programmable logic controllers (PLC). The creation and management of these automation programs, for example, the assignment of the programs to individual controllers, the loading/starting/stopping of the programs and/or the updating of programs, is typically performed in engineering systems, such as the Totally Integrated Automation (TIA) Portal from Siemens AG. These activities are generally referred to as engineering and are generally controlled manually, i.e., with a low degree of automation and correspondingly long revision times and high revision effort. In addition, the engineering system must usually also be locally connected to the industrial automation platform; the versions of the engineering system must be compatible with the respective versions and types of the automation platforms (controllers) used, etc.

In the following, at least the processes of transferring an already created automation program to the destination platform or "target", i.e., the industrial automation platform (PLC, etc.), initiating and terminating the execution of the automation program (Start/Stop), receiving and forwarding of acknowledgment messages from the industrial automation platform to a control entity (e.g., Human Machine Interface (HMI)) during the execution of the automation program are collectively referred to as "management" and "control" of the automation program.

For modular, IT-based systems, i.e., systems from conventional computer technology, the technology of software containers has been making inroads for some time. In particular in distributed systems having multiple computer nodes, container-based programs are deployed on the computer nodes, executed and monitored via container orchestration technologies, such as Kubernetes(https://kubernetes.io/de/). In Kubernetes, this is implemented via a central component, i.e., the master or Kubernetes master. This receives descriptions of the software components that are to be executed, i.e., the manifest. The master selects suitable nodes and executes the container with the software components there, which is called "deployment". In addition, the Kubernetes master monitors the components and performs recovery actions as needed. In addition, changes to the components can be made at runtime, for example, launching updated versions, and/or scaling (starting/stopping instances to increase/decrease throughput).

An essential feature for the use of Kubernetes is that the entire software is combined into one or more software containers (e.g., docker containers https://www.docker.com/resources/what-container), where this container is transferred into a runtime environment, i.e., a "container runtime", on a piece of computer hardware (usually called a "node"). A component of a "node" is a "kubelet", which is a locally executed piece of software that interacts with the managing Kubernetes master and the local container runtime in order to download the container with the software locally, execute it and monitor its operation.

As already mentioned, up to now, the management (creation, loading, starting, stopping) of automation programs has usually been implemented largely manually using special engineering systems that are locally connected to the industrial automation platform (industrial controllers, PLCs, etc.). Automation programs are usually manually assigned to the individual automation platforms (e.g., programmable logic controllers (PLCs).

Furthermore, the use of classical engineering systems is usually dependent on an instance of these engineering systems being locally present in an industrial network; a "remote control", in particular in a cloud-based approach, requires dedicated access from a remote workstation to the local engineering system, which requires a complex configuration of the overall system.

The publication Goethals et al. "FLEDGE: Kubernetes Compatible Container Orchestration on Low-Resource Edge Devices" (ISBN: 978-3-642-36741-0) shows the use of virtual Kubelets for "orchestration", i.e., deployment and operation of containers with software on devices with limited resources.

The publication Goldschmidt et al. "Container-based architecture for flexible industrial control applications" (Journal of Systems Architecture Vol. 84 (2018) pages 28-36) discloses the emulation of proprietary PLC Hardware in a container for execution of proprietary control programs.

SUMMARY OF THE INVENTION

In view of the foregoing, it is therefore an object of the present invention to manage and control classical automation programs with a higher degree of automation, while using the most well-established, widespread and easy-to-learn methods and reducing the dependencies of engineering systems on the managed industrial automation platforms and mitigating or eliminating the local dependence on the engineering systems.

The object of the invention is achieved principally by a known system of a Kubernetes master and kubelets, where such known systems are intended for the management and control of container-based programs in container runtime environments. In accordance with the invention, virtual kubelets see https://github.com/virtual-kubelet) are used, which behave like a "genuine" container in relation to the Kubernetes master, but are equipped with a special provider interface (see https://virtual-kubelet.io/docs/providers/#provider-interface), and which are configured in accordance with the invention for the management and control of automation programs for industrial automation platforms, in particular programmable logic controllers. Virtual kubelets are known in principle and are classically used to allow software containers to be used on almost any platform that can provide a container runtime environment, in particular emulated container runtime environments in the cloud environment, i.e., on cloud service providers, such as Amazon Web Service (AWS).

In accordance with the invention, however, a provider interface or provider plug-in is provided for the virtual kubelets, which manages automation programs instead of the containers, where automation programs must be managed in a specific way and transferred to the industrial automation platform, where they are started, and/or stopped. This means that in accordance with the invention, at least those functionalities of classical industrial engineering systems, which are configured with the "deployment" (software distribution) and the control of the software to be executed on automation platforms, must be provided via the provider interface. The virtual kubelet configured in this way can run in the domain of the industrial automation assembly, for example, on suitably equipped programmable logic controllers or generally automation platforms themselves, but also conveniently on separate servers, in particular on an industrial edge device. Alternatively, execution outside the industrial domain is conceivable, where the provider interface then requires data access to the automation platform, such as via a VPN access.

The foregoing and other objects and advantages are achieved in accordance with the invention by a method for managing an automation program for an industrial automation platform is provided, where the automation program is transferred to the automation platform and the execution of the automation program on the automation platform is controlled. In a first step, the automation program, or a reference to this automation program, is transferred from a Kubernetes master to a virtual kubelet, where in a second step, the transferred or referenced automation program is transferred to the industrial automation platform via a provider interface of the virtual kubelet, and where in a third step, the execution of the transferred automation program on the industrial automation platform is controlled, in which step, via the provider interface, control commands are transferred to the industrial automation platform and acknowledgement messages of the industrial automation platform are received and processed or forwarded to a control entity, in particular to the Kubernetes master or an operating and monitoring device (HMI device). This method makes it possible to manage, deploy and run automation programs using the resources of container orchestration systems.

It is also an object of the invention to provide an assembly for managing an automation program for an industrial automation platform, having a Kubernetes master for transferring the automation program or a reference to the automation program to a virtual kubelet, having the virtual kubelet for receiving the automation program or the reference to the automation program and for receiving instructions for installing the automation program on the automation platform and for controlling the execution of the automation program on the automation platform, and having a provider interface of the virtual kubelet for transferring the automation program to the automation platform, for controlling the program execution of the automation program and for receiving and forwarding acknowledgment messages from the automation platform during the execution of the automation program. This assembly allows the benefits already explained based on the method to be achieved.

Although it is possible in principle to provide an automation program or its source code directly with an appropriately designed Kubernetes master and its corresponding counterpart, the virtual kubelet, in practice a reference to the automation program is transmitted by the Kubernetes master. The reference can be any suitable reference or "link" to a storage location from which the virtual kubelet or its provider interface can load the automation program or its source code, in particular a URL, storage path information, an internet address, and/or an FTP address.

In an advantageous embodiment, the transferred or referenced automation program is preprocessed before it is transferred to the automation platform. This makes it possible in particular to address different automation platforms with different properties. For example, the automation program can be compiled appropriately for the respective target hardware while taking into account the fact that different automation platforms are also addressed and programmed in different ways. In particular, in an advantageous embodiment the provider interface can "assemble" the final automation program from a plurality of sources, e.g., integrate referenced objects or libraries, compile the program together, and/or reload updates of individual elements.

In an advantageous embodiment, a provider interface or an appropriately extended virtual kubelet with an integrated provider interface (provider interface plug-in) can supply a multiplicity of automation platforms of different types with automation programs and control their execution. However, in other advantageous embodiments, it is also possible to offer different specialized provider interfaces for different types or type series of automation platforms and thus also to equip different virtual cubes or alternatively to integrate multiple different specialized provider interface plug-ins into a common virtual kubelet. Due to this flexibility, the corresponding systems can not only be widely deployed, but can also be scaled to almost any level.

The specialized provider interfaces, i.e., the plug-ins for extending the virtual kubelets, advantageously contain many functions that either correspond to or have even been taken from the functions of the classical engineering systems for industrial automation platforms. In a particularly advantageous embodiment, the provider interface addresses a programming interface, an Application Programming Interface (API), of an actually existing engineering system in order to use its functionalities (e.g., compiling software) or even to deploy and control the automation programs locally in an automation network.

In another advantageous embodiment, Custom Resource Definitions (CRD) (see: https://kubernetes.io/docs/concepts/extend-kubernetes/api-extension/custom-resources/) are used in Kubernetes to manage resources of the automation platform and/or to assign the automation program to multiple automation platforms. This allows the special features of automation platforms, which must be allowed for in comparison to the use of container-based platforms, to be defined and automatically taken into account in terms of data technology.

It is also advantageously possible to use a Custom Scheduler (see: https://kubernetes.io/docs/concepts/scheduling/kube-scheduler/), i.e., a scheduler adapted to the use of automation platforms, for the deployment (distribution) of the automation programs to their targets. In Kubernetes, a scheduler can be specified for each "pod" that is used to process this pod. If a separate scheduler is used for the PLC programs, i.e., one which is specifically adapted to the requirements of the automation platforms, the following can be achieved: one the one hand, PLC programs can be easily distinguished from other pods. This allows PLC programs to be assigned to suitable PLC nodes. On the other hand, special features can be taken into account when scheduling PLC programs in the Custom Scheduler, in particular the fact that automation platforms are often not filled by "downloading" a package in the sense of a container, but in multi-step sequences.

Quality of service parameters (QoS parameters) are used in one embodiment in order to assign a PLC program to a suitable PLC node or a suitable automation platform. Examples of QoS parameters are computing capacity, latency times, cycle time, availability, and/or privacy/security. This enables stand-alone, i.e., automatic and above all functionally reliable, load distribution.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention is explained below using the drawing. At the same time, the exemplary embodiment will be used to explain an assembly according to the invention, in which.

DETAILED DESCRIPTION OF THE EXEMPLARY EMBODIMENTS

Figure 1:
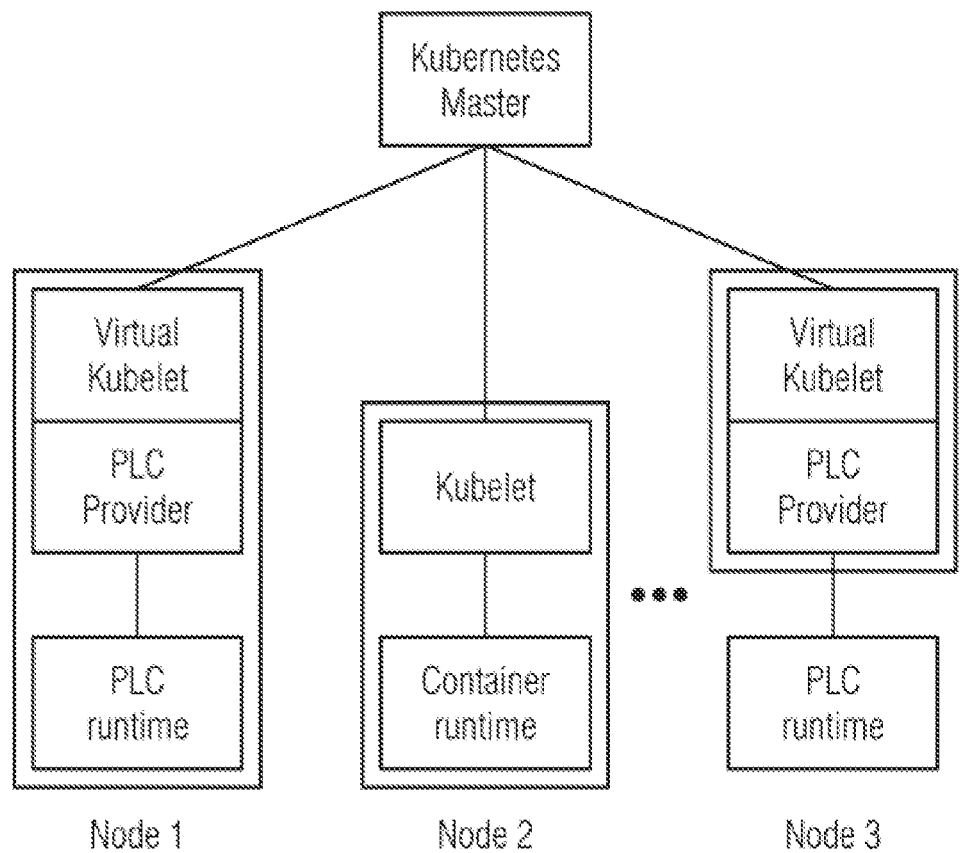
FIG. 1 shows a schematic representation of a Kubernetes master, which supplies and controls three different nodes with different types of programs in accordance with the invention.

FIG. 1 shows the deployment of software to three different computing nodes Node 1, Node 2, Node 3 (target hardware, "Target"). This process is controlled by a central management system, the Kubernetes master. In this application (labeled "Kubernetes" in the FIG. 1), the local control of these processes on the computer nodes Node 1, Node 2, Node 3, i.e., the target hardware for programs to be executed, is performed by an agent that is present on each node ("kubelet").

With reference to FIG. 1, a classical kubelet is executed locally on the node Node 2, which is configured to manage software containers. The kubelet can execute software containers specified via an instruction ("Manifest") of the Kubernetes master in a local runtime environment "Container Runtime". The software containers are loaded from a specified source as instructed by the kubelet.

For this purpose, the master provides the kubelet of a node with the appropriate instructions, for example, with the manifest or later, for starting, stopping, or changing the software components running on the node. In Kubernetes, these are usually software containers or a grouping of software containers ("pods"). The interface between the Kubernetes master and the kubelet is defined. The kubelet has a defined interface to the runtime environment ("Container Runtime") on the node ("Node") in order to start and manipulate the software containers.

An extension of Kubernetes introduces virtual kubelets; these are shown in the FIG. 1 by the nodes Node 1, Node 3.

Virtual kubelets are classically used to manage software containers in an incompatible container environment (e.g., Windows containers for computers with the Microsoft Windows operating system). The principle of a virtual kubelet is that its interface to the Kubernetes master is designed like that of a conventional kubelet. A virtual kubelet thus has the same interface "upwards" as a classical kubelet, and the master communicates in the opposite direction as with a classical Kubernetes node, i.e., a node that can manage containers (or pods) (see the example with the node Node 2). In the "downward" direction, i.e., in communication with the "Target", a virtual kubelet can in principle have any interface. In the current implementation, (https://github-.com/virtual-kubelet/Virtual Kubelet/) this is solved by "providers". In the classical approach, these providers either serve to make larger units (clusters or serverless container environments like Fargate) appear as a single node, or to resolve incompatibilities (e.g., for Microsoft Azure containers).

In the illustrated solution in accordance with the invention of the nodes Node 1, Node 3, a virtual kubelet is used for the management of an automation program or parts of an automation program. A specific PLC provider is implemented for this purpose, which can start, stop, and/or monitor the automation program on the corresponding automation platform (referred to as "PLC Runtime" hereafter and in FIG. 1). The basic functions that the provider must fulfill are described in https://github.com/virtual-kubelet/virtual-kubelet.

In this exemplary embodiment, this specific provider is implemented as a plug-in for the virtual kubelet; other implementations can provide a separate component for this. The plug-in, i.e., here the "PLC Provider", can itself be modular in design, in particular having a generic component for connecting to the hosting virtual kubelet and, on the other hand, can have a specific module for managing each specific type of automation platform.

Specifically, the provider plug-in PLC Provider communicates with the runtime environment for automation programs of the addressed automation platform, the PLC Runtime. Using the node Node 1, the case is shown in which the virtual kubelet with the PLC Provider is installed on the automation platform to be managed (Node 1) itself. The virtual kubelet and the PLC Provider can be part of the firmware or installed as a separate program. On the other hand, the node Node 3 shows the case in which the virtual kubelet and the PLC Provider run on a separate machine, for example an industrial edge device, which comprises both an interface to the industrial level with the automation platform Node 3 as well as a further interface to the Kubernetes master, which can also run on a server of a cloud provider.

To prepare the programming, an automation program for an automation platform (PLC) is generated, e.g., within a project of an industrial engineering system (e.g. TIA Portal project), mapped onto a "pod" and stored in a source that can be referenced. The automation platform (PLC or virtual PLC) itself has been configured and set up for networking such that it can be used. A virtual PLC is a purely software-based PLC instance that is executed in a virtual machine. Functionality and logical interfaces of the virtual PLC correspond to a real PLC. A mapping of some basic functions of the PLC provider for managing the automation platforms Node 1, Node 3 would then be possible as follows:

CreatePod->Load an automation program on an existing PLC or virtual PLC instance and start it. The corresponding resources of the PLC/PLC-instance are assigned and marked as assigned.

UpdatePod->Make changes to an active automation program on a PLC/virtual PLC instance. Changes can relate to the software version and/or the configuration or execution parameters of the automation program.

DeletePod->Stop a running automation program and release the assigned resources on the PLC/virtual PLC instance.

GetContainerLogs->Forwarding the diagnostic buffer or the part of the diagnostic buffer of the PLC that affects the corresponding automation program.

GetPodStatus->Show current execution details for the relevant automation program, such as cycle times, memory requirements, diagnostic status, display contents.

NodeConditions->Show abstracted state of the PLC/virtual PLC instance (ready, stopped, starting, out of memory).

OperatingSystem->Display version of the PLC.

In this mapping, existing engineering tools (e.g., TIA Portal, Step 7) could be used entirely within the PLC provider. Modular components, however, offer an advantage in keeping the PLC provider lean and also allowing it to run on nodes with low computing capacity. For example, the basic functions mentioned above can thus be provided as modules or plug-ins in the PLC provider. It is also possible to implement these basic functions at least partially by invoking corresponding services in a cloud or in an engineering system running elsewhere.

The PLC provider has therefore implemented an operating procedure to be able to load the PLC programs provided or referenced for this purpose and transfer them to the PLC Runtime when starting a pod. This can be performed from the referenced source (repository) or via other sources or directories; alternatively, it is possible to change the Kubernetes components (Kubernetes Master, Virtual Kubelet) such that at least some of the PLC programs themselves are handled. In addition, the PLC provider or a service addressed by this provider can also make changes to the automation program, in particular a platform-specific customization or compilation of the program code depending on the type and current state (status, e.g., free storage space, and/or firmware version) of the PLC Runtime, i.e., the runtime environment or the automation platform as such.

In particular in mixed systems (different PLC types, PLCs mixed with software container systems, standard PCs, container runtimes in the cloud), it must be possible to differentiate/identify the specific type of runtime. This can be achieved, for example, via labels in Kubernetes. It is also possible for the PLC provider to determine the type of runtime environment and other parameters itself and to make the appropriate modifications to the automation program and the addressing or, in general, to the data exchange with the runtime environment.

The PLC provider can be integrated into automation platforms (PLCs). This is easily possible, in particular in the case of modern automation platforms even at the time of delivery, by pre-installing it with or as part of the firmware. As mentioned, this can be seen from the example of node Node 1. In existing systems, the PLC provider can also be started on existing computer nodes or alternatively on additional nodes in order to connect to the automation platform/PLC and the local runtime environment via the network. It is possible, for example, to use edge devices (industrial edge devices) or cloud nodes as a platform for the PLC provider or the appropriately configured virtual kubelet, see node Node 3 in FIG. 1.

While the above text describes the route of the software distribution, i.e., the "deployment" of a pod with at least one automation program, control information, status messages, and/or debug values can be forwarded in the reverse direction from the "Target" to the PLC provider of the responsible virtual kubelet and from there, possibly in processed form, to the Kubernetes master or to an alternative target. Such alternative targets can be, in particular, operating and monitoring devices (HMI; SCADA; MES) within or outside an automation network. Cloud-based applications can also be accessed. The targets can be specified using the Kubernetes master; alternatively, the Kubernetes master can also forward this data, possibly also in a modified form.

With the aid of the disclosed embodiments of the invention, PLC programs can therefore be managed and operated using the resources of container orchestration systems. Mixed operation of PLC programs with software containers is also possible.

This enables a (partially) automated assignment of PLC programs to nodes, depending on node capacity, system load, and/or availability (i.e., generally dependent on Quality of Service parameters). This enables faster commissioning and update times by automated "deployment" (initial installation, updating, troubleshooting, and/or test,) of PLC programs or program parts. Another advantage is the increased availability due to the now possible equivalent circuit measures, i.e., monitoring of PLC programs, restarting on the same or on a different node. It is now also possible to integrate easily into CI/CD systems or DevOps, i.e., an automated chain of source code revision, translation, testing, commissioning.

The use of a virtual kubelet with the provider plug-in configured for industrial automation platforms opens up the Kubernetes "ecosystem" for the management of PLC programs, e.g., with existing tools for monitoring, tracing, roll-out strategies, version control, rollback. Management of PLC programs is thus possible with established standard tools from the open-source community, where a broad competence base is available and the software tools used are constantly under development. A uniform software management in mixed systems (IT-based with containers and classical PLCs) brings advantages due to a uniform infrastructure and lower requirements on the additional training of IT system experts. In addition, existing PLC systems in the field can be accessed using IT mechanisms without changing the PLC systems.

Figure 2:
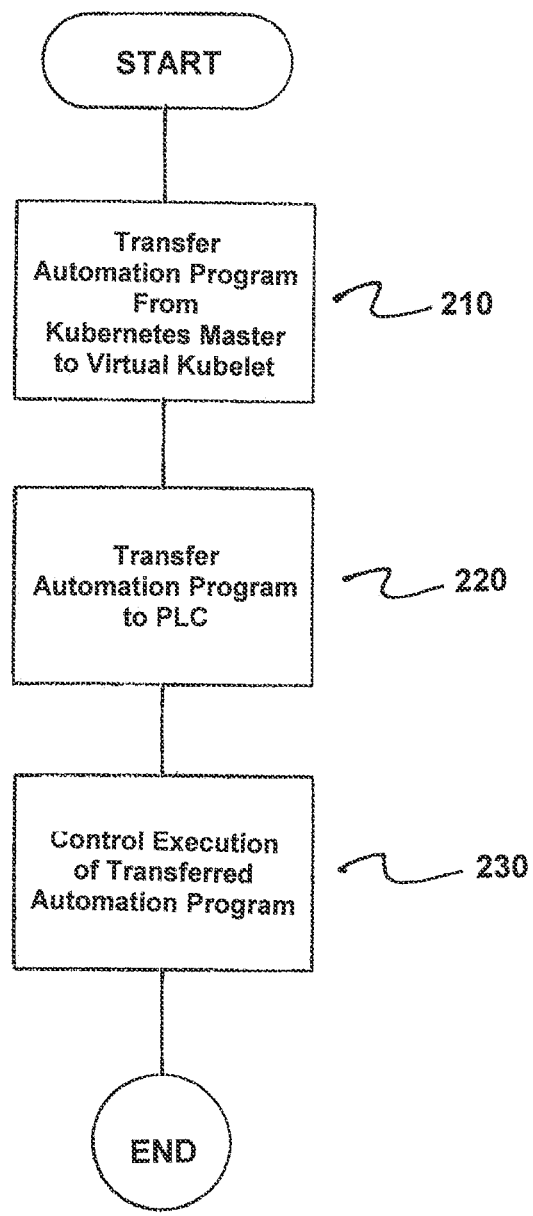
FIG. 2 is a flowchart of the method in accordance with the invention.

FIG. 2 is a method for managing an automation program for a programmable logic controller, where the automation program is transferred to the programmable logic controller and execution of the automation program on the programmable logic controller is controlled.

The method comprises transferring, during a first step, the automation program or a reference to this automation program from a Kubernetes master to a virtual kubelet, as indicated in step 210.

Next, during a second step, the transferred or referenced automation program is transferred to the programmable logic controller via a provider interface of the virtual kubelet, as indicated in step 220.

Next, during a third step, the execution of the transferred automation program on the programmable logic controller is controlled, where via the provider interface, control commands are transferred to the programmable logic controller and acknowledgement messages of the programmable logic controller are received and processed or forwarded to a control entity, as indicated in step 230.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for managing an automation program for a programmable logic controller, the automation program being transferred to the programmable logic controller and execution of the automation program on the programmable logic controller being controlled, the method comprising:
   transferring, during a first step, the automation program or a reference to this automation program from a Kubernetes master to a virtual kubelet;
   transferring, during a second step, the transferred or referenced automation program to the programmable logic controller via a provider interface of the virtual kubelet; and
   controlling, during a third step, the execution of the transferred automation program on the programmable logic controller, via the provider interface, control commands being transferred to the programmable logic controller and acknowledgement messages of the programmable logic controller being received and processed or forwarded to a control entity.

2. The method as claimed in patent claim 1, wherein the control entity comprises the Kubernetes master.

3. The method as claimed in patent claim 1, wherein during the first step, one of a storage address comprising a URL, storage path information, a specification relating to the contents of an app store and another address is utilized as the reference to the automation program.

4. The method as claimed in patent claim 1, wherein during the second step, the automation program transferred or specified to the virtual kubelet as a reference is preprocessed before transfer to the programmable logic controller.

5. The method as claimed in claim 4, wherein during the second step, the automation program is compiled before the transfer.

6. The method as claimed in patent claim 4, wherein during the second step, the automation program to be transferred is created from at least one of (i) a multiplicity of referenced sources and (ii) program parts transferred from the Kubernetes master.

7. The method as claimed in patent claim 5, wherein during the second step, the automation program to be transferred is created from at least one of (i) a multiplicity of referenced sources and (ii) program parts transferred from the Kubernetes master.

8. The method as claimed in patent claim 1, wherein in an assembly having a multiplicity of programmable logic controllers, a separate provider interface is utilized for each individual programmable logic controller or for a group of programmable logic controllers of the same or similar type; and wherein each of the provider interfaces utilized performed customization of the automation program to be transferred to the respective programmable logic controller to the type and the specific properties of a respective target controller.

9. The method as claimed in patent claim 1, wherein the virtual kubelet utilizes an industrial engineering system or parts thereof as a provider interface; and wherein the engineering system or the parts thereof are controlled by instructions transmitted from the Kubernetes master to the virtual kubelet.

10. The method as claimed in patent claim 1, wherein custom resource definitions (CRD) in Kubernetes are utilized to at least one of (i) manage resources of the programmable logic controller and (ii) assign the automation program to one of a plurality of automation platforms.

11. The method as claimed in patent claim 1, wherein a scheduler comprising a Kubernetes Custom Scheduler customized to use of programmable logic controllers is utilized for deployment of the automation program on the programmable logic controllers.

12. An assembly for managing an automation program for a programmable logic controller, comprising:
   a Kubernetes master for transferring the automation program or a reference to the automation program to a virtual kubelet, the virtual kubelet receiving the automation program or the reference to the automation program, receiving instructions for installing the automation program on the programmable logic controller, and controlling the execution of the automation program on the programmable logic controller; and
   a provider interface of the virtual kubelet for transferring the automation program to the programmable logic controller, for controlling the program execution of the automation program, and for receiving and forwarding acknowledgment messages of the programmable logic controller during the execution of the automation program.

* * * * *